United States Patent
Foy

(10) Patent No.: US 10,890,007 B2
(45) Date of Patent: Jan. 12, 2021

(54) SWIMMING POOL LIGHT

(71) Applicant: 9213-4550 Qc Inc., Drummondville (CA)

(72) Inventor: Jerome Foy, Orford (CA)

(73) Assignee: 9213-4550 QC inc., Quebec (CA)

( * ) Notice: Subject to any disclaimer, the term of this patent is extended or adjusted under 35 U.S.C. 154(b) by 0 days.

(21) Appl. No.: 16/501,269

(22) PCT Filed: Sep. 14, 2017

(86) PCT No.: PCT/CA2017/000206
§ 371 (c)(1),
(2) Date: Mar. 13, 2019

(87) PCT Pub. No.: WO2018/049507
PCT Pub. Date: Mar. 22, 2018

(65) Prior Publication Data
US 2019/0301185 A1 Oct. 3, 2019

(30) Foreign Application Priority Data

Sep. 16, 2016 (CA) ..................... 2942308
Oct. 24, 2016 (CA) ..................... 2946361

(51) Int. Cl.
| | | |
|---|---|---|
| *E04H 4/14* | (2006.01) | |
| *F21S 9/03* | (2006.01) | |
| *F21V 33/00* | (2006.01) | |
| *H02J 7/35* | (2006.01) | |
| *F21V 31/00* | (2006.01) | |
| *F21W 131/401* | (2006.01) | |

(52) U.S. Cl.
CPC ............... *E04H 4/148* (2013.01); *E04H 4/14* (2013.01); *E04H 4/144* (2013.01); *F21S 9/03* (2013.01); *F21V 33/006* (2013.01); *H02J 7/35* (2013.01); *F21V 31/00* (2013.01); *F21W 2131/401* (2013.01)

(58) Field of Classification Search
CPC ....... E04H 4/148; E04H 4/144; F21V 33/006; F21S 9/03
See application file for complete search history.

(56) References Cited

U.S. PATENT DOCUMENTS

| | | | | |
|---|---|---|---|---|
| 3,801,022 A | * | 4/1974 | Cassey ...................... | F21S 8/00 362/257 |
| 5,934,796 A | * | 8/1999 | Quereau ................... | F21S 8/00 362/101 |
| 2005/0180127 A1 | * | 8/2005 | St-Hilaire ................. | E04H 4/14 362/101 |
| 2007/0247838 A1 | * | 10/2007 | Fan ........................... | F21S 8/00 362/192 |
| 2016/0356086 A1 | * | 12/2016 | Saccoccio ............... | E06C 7/183 |

* cited by examiner

*Primary Examiner* — Joseph L Williams
*Assistant Examiner* — Jose M Diaz
(74) *Attorney, Agent, or Firm* — Eric Fincham

(57) ABSTRACT

A light assembly for a swimming pool which comprises a solar panel (46) for generating electricity, the solar panel being located exteriorly of the swimming pool, a battery (52) electrically connected to the solar panel, a low voltage light (36) mounted in the swimming pool, and electrical wires (68) extending between the battery (52) and the low voltage light (36) to supply power thereto. In a preferred embodiment, the light assembly may be incorporated in a retrofit stair assembly.

4 Claims, 21 Drawing Sheets

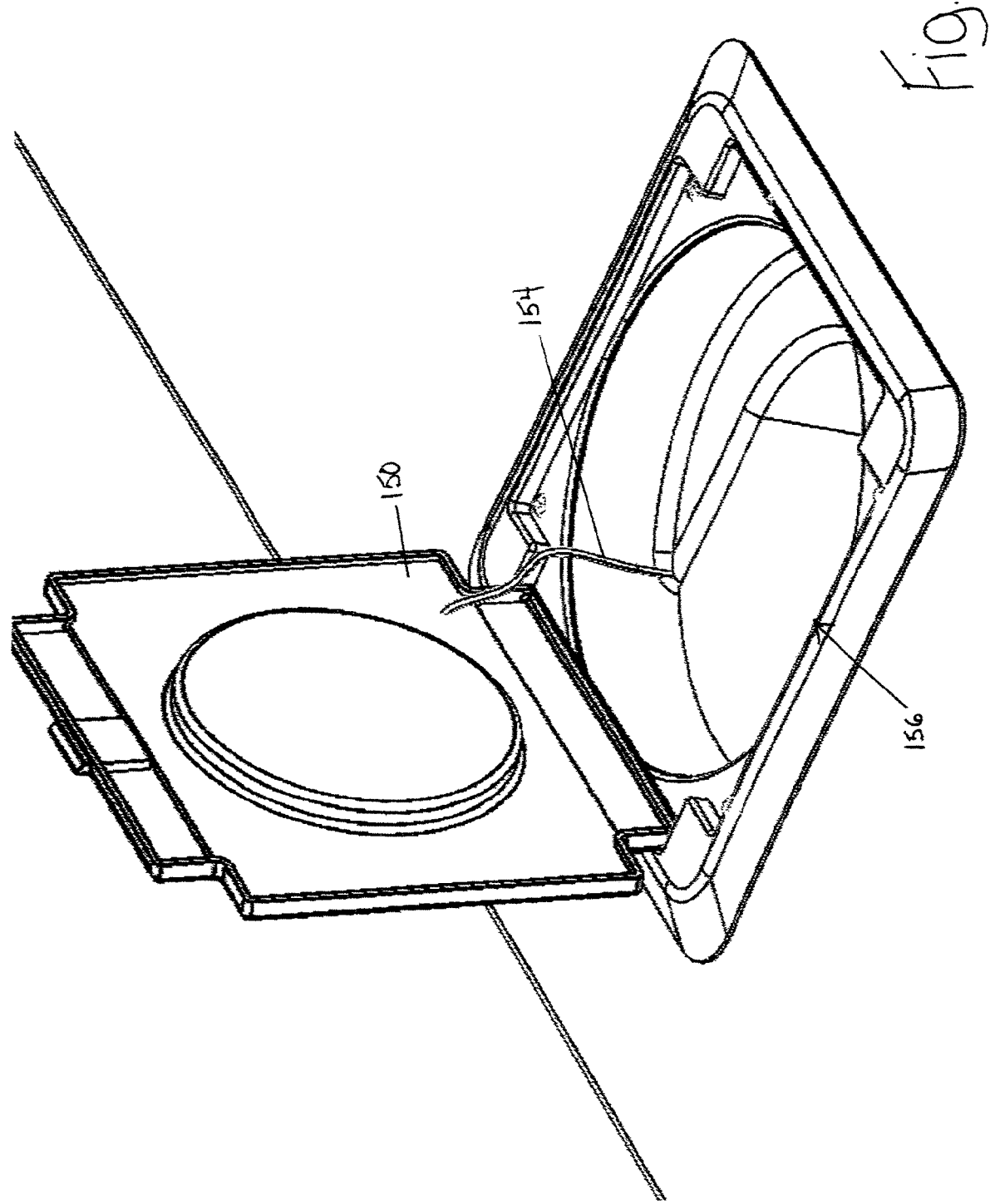

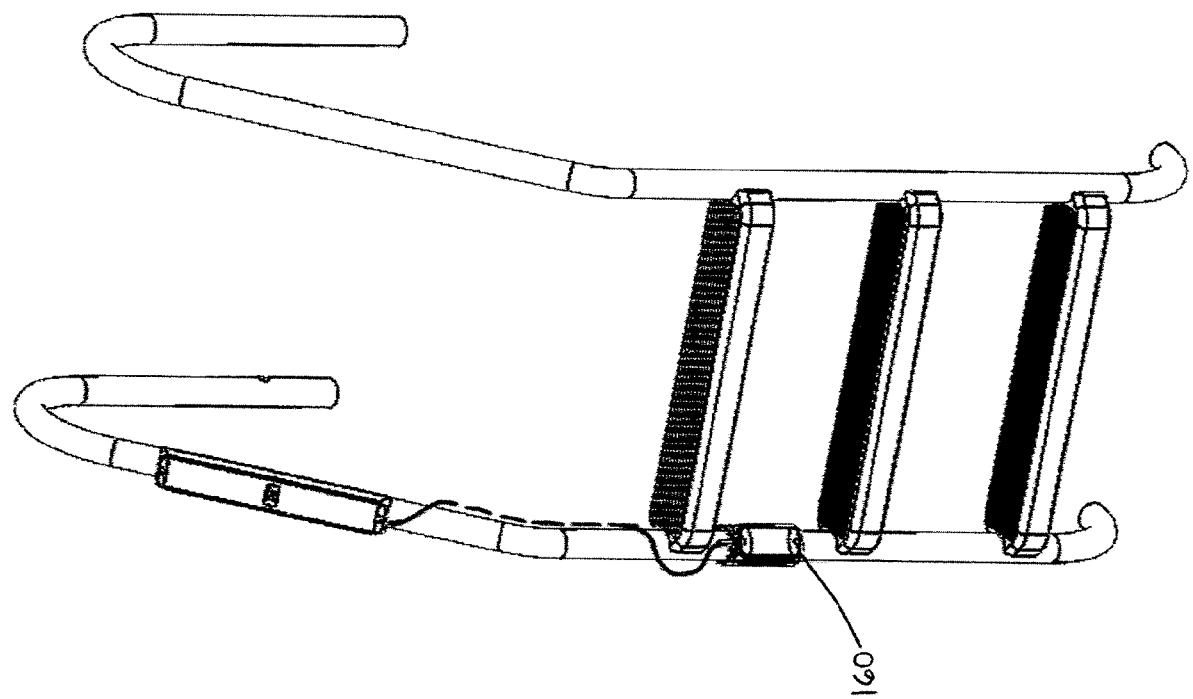

SWIMMING POOL LIGHT

FIELD OF THE INVENTION

The present invention relates to swimming pools and more particularly, relates to lighting systems for swimming pools.

BACKGROUND OF THE INVENTION

The use of lights in association with swimming pools is very common in the art. Apart from lights used in the pool area, a very popular accessory for use with swimming pools is the mounting of a light within the pool to shine and illuminate the water. Typically, such lights are mounted in an end wall of the pool. However, the mounting of the light represents a substantial cost since the light and all associated electrical connections must be sealed from the surrounding aqueous environment. Otherwise, the risk of electrical shock would be high.

Usually the incorporation of a light into the pool wall is done at the time of manufacture of the pool since retrofitting the same would require a substantial expense. Retrofitted lights require power cables which are cumbersome, costly and sometimes a safety hazard due to improper installation. Every year, aging built-in high voltage light fixtures are causing death and injuries to pool owners due to improper maintenance or installation.

SUMMARY OF THE INVENTION

It is an object of the present invention to provide one or more light assemblies which may either function as original equipment or be utilized as a retrofit with swimming pools.

According to one aspect of the present invention, there is provided a light assembly for a swimming pool comprising a solar panel for generating electricity, the solar panel being located exteriorly of the swimming pool, a battery electrically connected to the solar panel, a low voltage light mounted in the swimming pool, and electrical wires extending between the battery and the low voltage light to supply power thereto.

The light assembly of the present invention may be utilized in conjunction with other accessories or functioning parts of a swimming pool. Thus, the light assembly may be incorporated in a skimmer assembly which is designed to remove surface water and debris, filter the same and return the water to the pool. In such an arrangement, the solar panel may form the cover for the skimmer assembly.

In another embodiment, the light assembly of the present invention may be utilized in conjunction with a stair assembly. In particular, the light assembly of the present invention may be incorporated in various manners into the stair assembly. In one preferred embodiment, the light assembly will be incorporated in the handrail portion of the stair assembly.

The light assembly of the present invention will preferably utilize solar energy for powering the light assembly. The manufacture of various types of solar panels and receptors is well advanced and known in the art.

The light itself may be incorporated in the stair assembly so as to shine or illuminate the area around the stairs and in particular, below the water surface. The light may be incorporated in the rails, the steps, and/or the foot of the steps as will be discussed in greater detail hereinbelow.

The solar receptors or solar panels may be incorporated in various portions of the pool ladder. In one particular embodiment, the solar panels may form the escutcheon for the stairs where they are secured to the base exteriorly of the pool.

The present invention may be practised with either in-ground or above-ground pools. Although the ladder assemblies are different, each one can be utilized in the practice of the present invention.

When utilized with the pool ladders, the system has many advantages including the fact that there is no visible wiring. The cost of the installation would be substantially less than for a regular lighting system. Furthermore, the system of the present invention can be utilized as a retrofit for existing pools. In some instances, particularly when the system is used with pool ladders, one can either retrofit an existing ladder or more conveniently, a ladder and lighting system could be incorporated into a ladder which is sold on the retail market. The owner would then have the option of purchasing the same and merely installing the ladder to provide a light assembly without the requirement of having electricians install the same.

The lighting system can include features such as the ability to turn itself on in low light conditions. To do so, known light sensors can be utilized. The system could also have Bluetooth capabilities for remote communications.

BRIEF DESCRIPTION OF THE DRAWINGS

Having thus generally described the invention, reference will be made to the accompanying drawings illustrating embodiments thereof, in which:

FIG. 20 is a perspective view of a skimmer cover incorporating a solar panel on a skimmer; and FIG. 21 is a perspective view of a clip-on light which is attached to a ladder assembly.

DETAILED DESCRIPTION OF THE INVENTION

Figure 1:
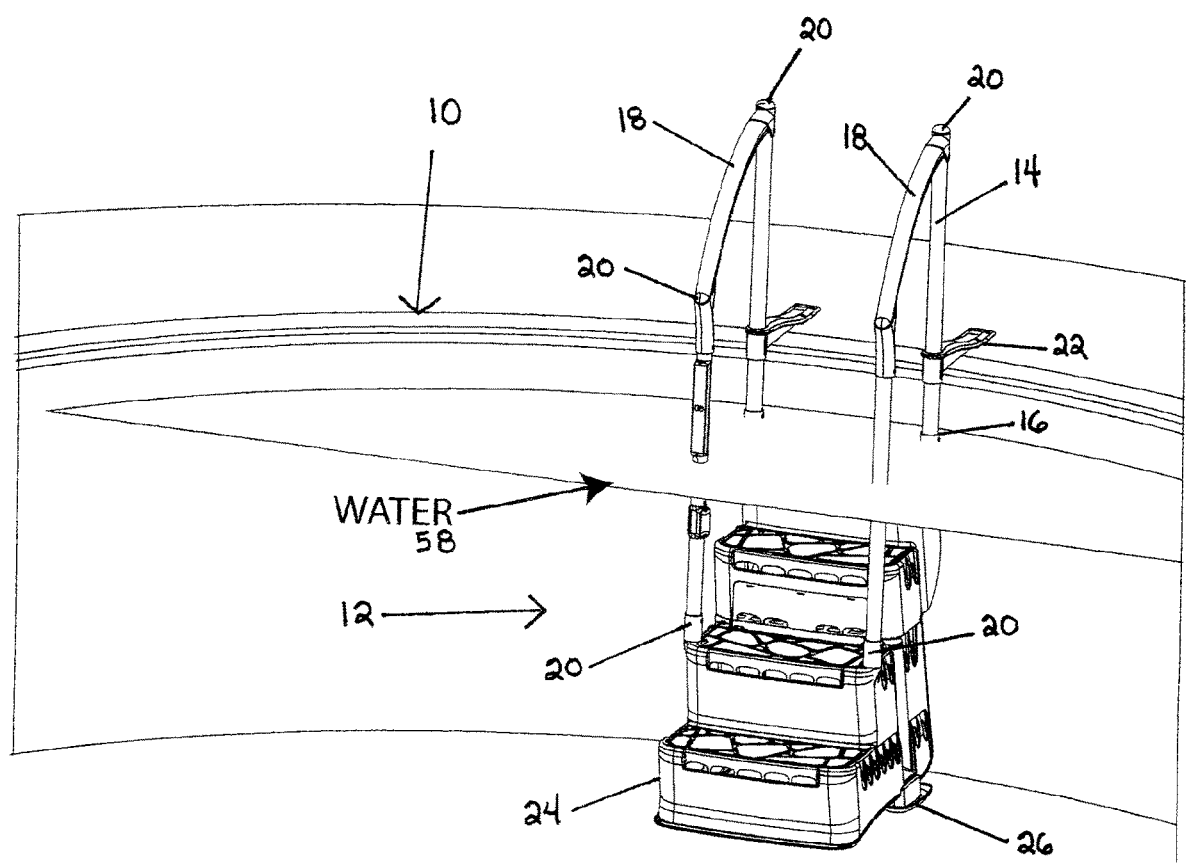
FIG. 1 is a perspective view of a stair assembly mounted in a pool and incorporating the light assembly of the present invention.
Figure 2:
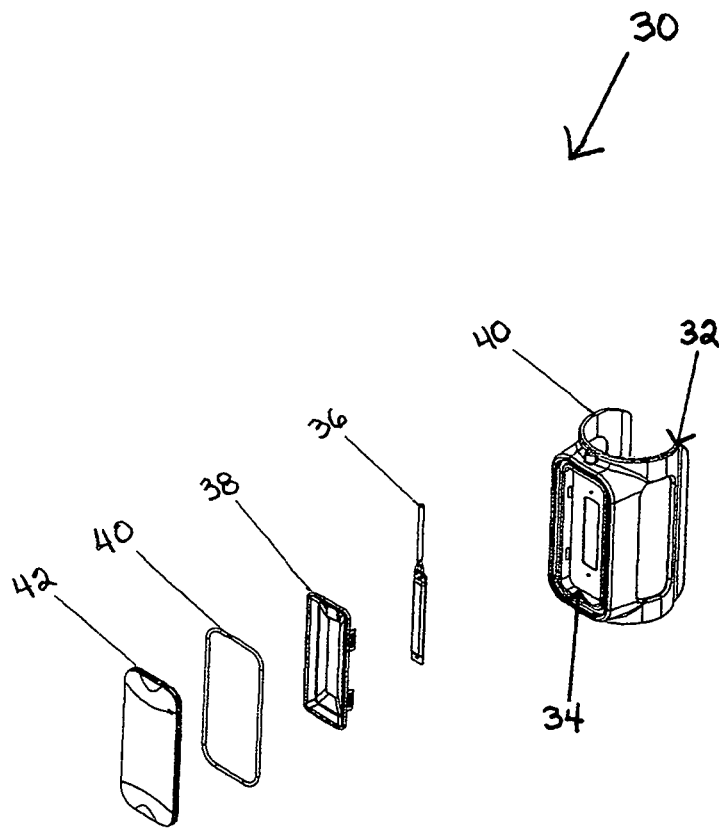
FIG. 2 is an exploded view of the light portion of the light assembly.
Figure 3:
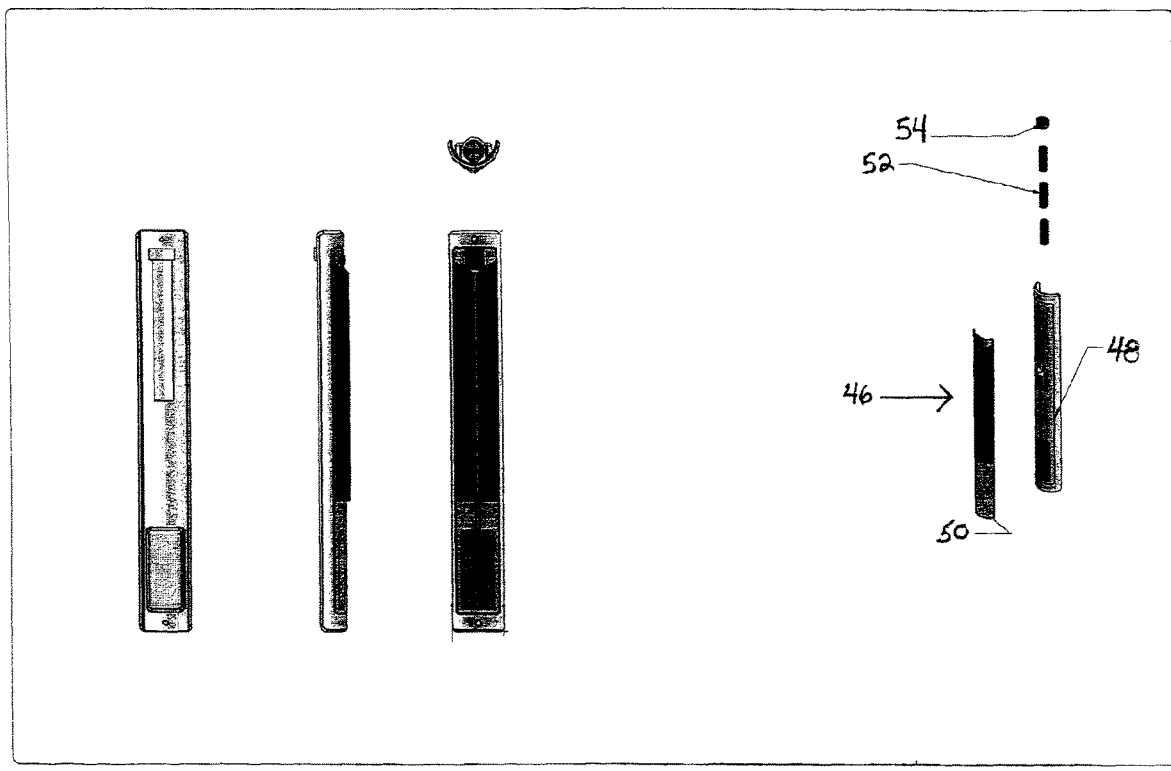
FIG. 3 is an exploded view of the photovoltaic assembly.

Referring to the drawings in greater detail and by reference characters thereto, there is illustrated a pool 10 into which there is mounted a step assembly 12. In the example, pool 10 may be of an above ground pool although the practice of the present invention can also be utilized with inground pools.

Stair assembly 12, as is conventional, provides "handles" to assist the bather entering the pool as well as exiting therefrom. The handles comprise a rear shaft 14, a front shaft 16, and a top shaft 18 forming a U-shaped handle. The shafts may be interconnected with conventional shaft connectors 20.

A pair of straps 22 functioning as anchors may be provided to secure stair assembly 12 in place to a pool deck or other substrate. One could also use brackets for the same purpose. Stair assembly 12 includes steps 24 while step assembly 12 sits on support 26.

Light assembly generally designated by reference numeral 30 includes a light housing 32. As may be seen, light housing 32 is semi circular in configuration and is designed to fit about front shaft 16. Light housing 32 may either be mounted on the surface of shaft 16 or in the alternative, may be recessed within shaft 16 by utilizing a suitable cut-out.

A recess 34 is provided in light housing 32 to receive the remaining components which comprise a light housing 32, LED board assembly 36, reflector 38, a clear lens 42 and an O-ring 40 which is designed to fit about light housing 32 to provide a waterproof seal.

There is also provided a photovoltaic panel generally designated by reference numeral 46. Such panels are also known as solar panels. A housing 48 is provided along with a lens 50. A plurality of rechargeable batteries 52 are utilized to store power from photovoltaic panel 46. A door 54 may be utilized to seal the batteries within housing 48.

Figure 4:
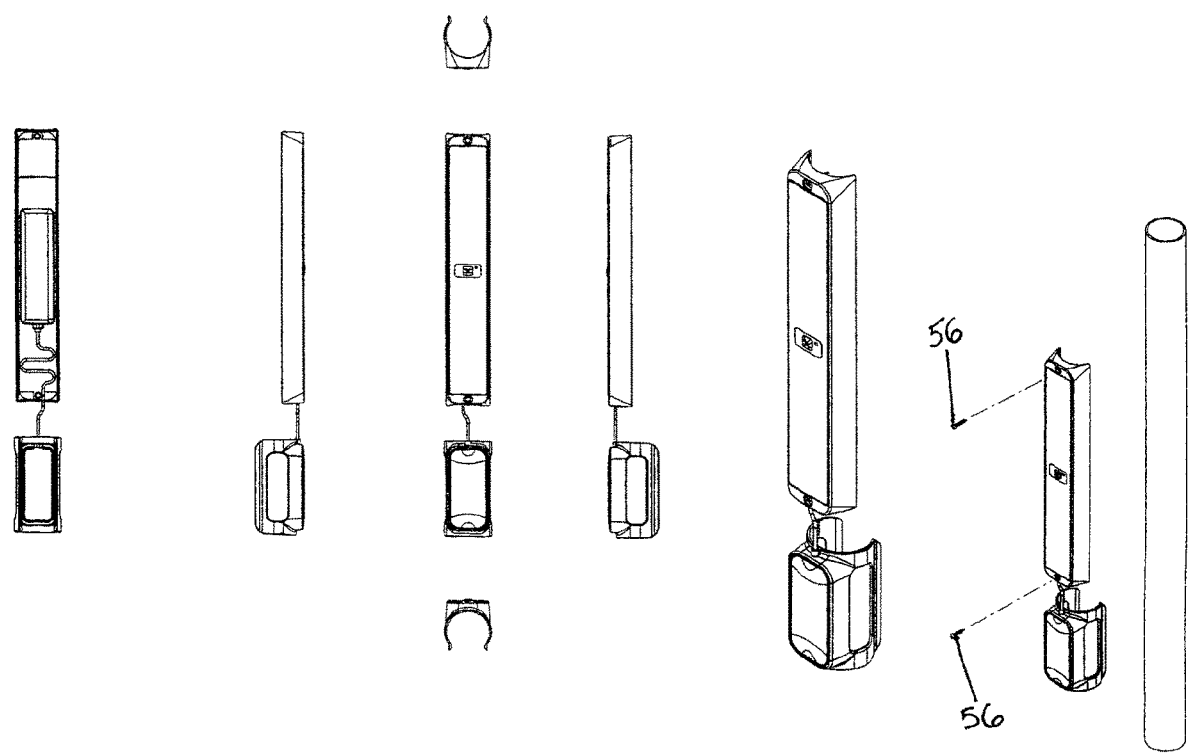
FIG. 4 illustrates various views of the assembled light assembly.

As may be seen in FIG. 4, screws 56 may be utilized to secure the assembly to front shaft 16. The assembly can also be secured to top shaft 18. Alternatively, the assembly may be formed as an integral part of the stairs. The arrangement is such that, as shown in FIG. 1, water level 58 is located between light assembly 30 and photovoltaic panel 46.

If desired, there may be a switch utilized to turn light assembly 30 on and off. Alternatively, other arrangements such as timers, light sensors, and the like may be utilized in conjunction with the present invention.

Figure 5:
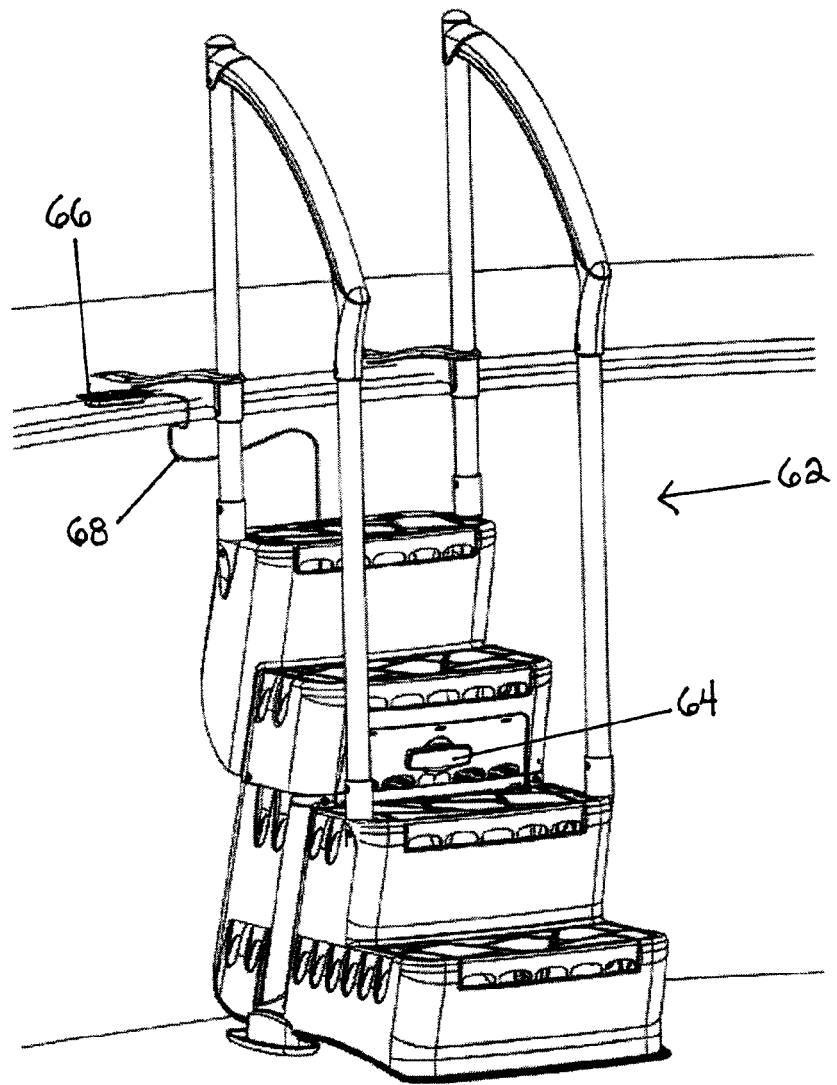
FIG. 5 is a perspective view of a further embodiment of the present invention.
Figure 6:
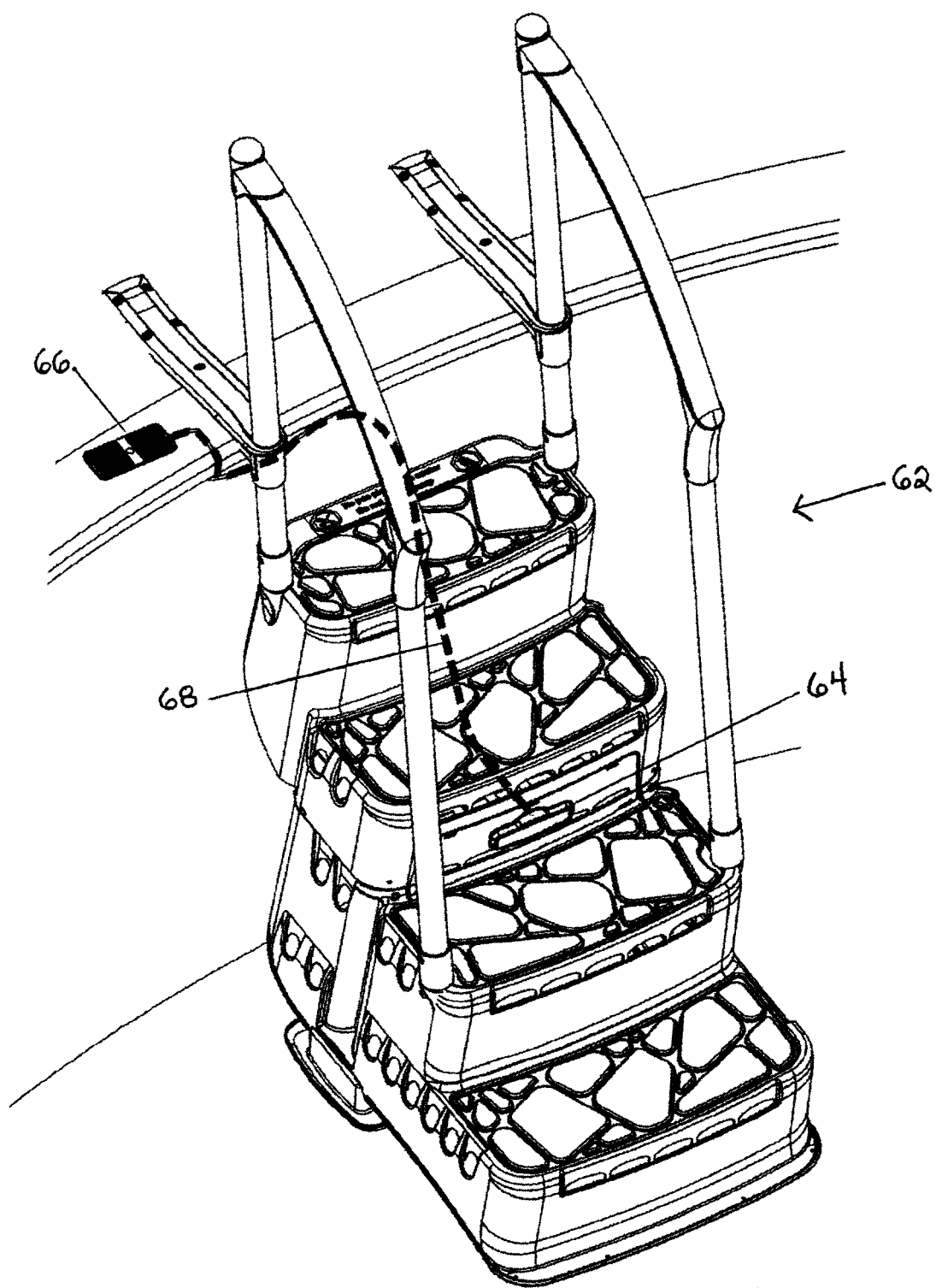
FIG. 6 is a perspective view similar to that of FIG. 5.

In the embodiment of FIG. 5, there is provided a stair assembly generally designated by reference numeral 62. Mounted in the riser of one of the steps is a light 64 while exteriorly of the pool there is a solar panel 66. The two are interconnected by means of electrical cord 68.

Figure 7:
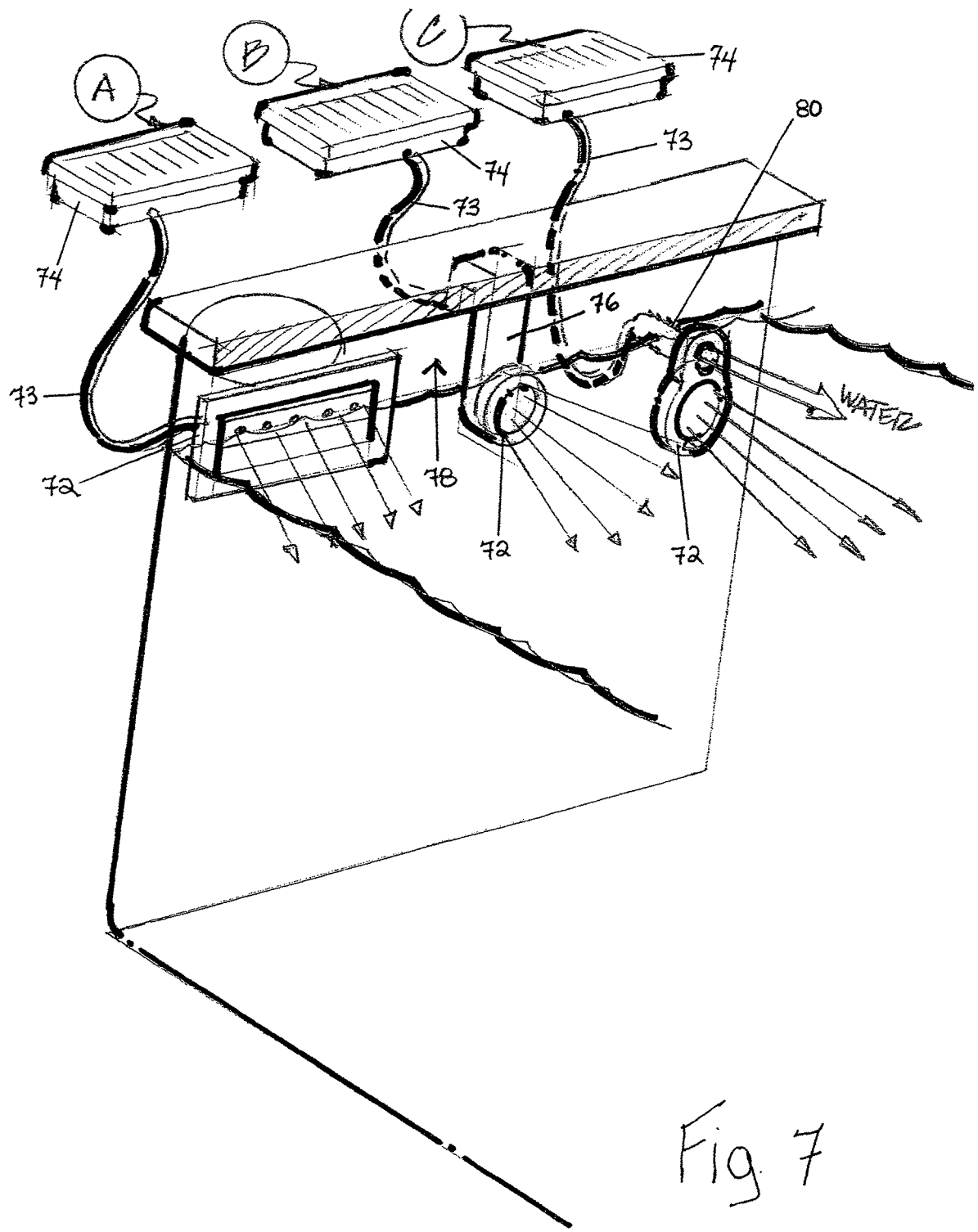
FIG. 7 is a perspective view of three further embodiments of the present invention.

Turning to FIG. 7, there are illustrated three different arrangements designated by reference characters A, B and C. In the arrangement of A, there is provided a light 72 and a solar panel 74 which are interconnected by cord 73. Alternative arrangements are shown by reference characters B and C. Similar reference numerals are utilized for similar components. In the arrangement of B, there is provided a mounting bracket 76 which has a recess 78 which may be used to place the light 72 on the edge of an above ground pool.

In the arrangement of C, light 72 is associated with a water return outlet 80. Again, cord 73 interconnects light 72 and solar panel 74 which could form the cover.

Figure 8:
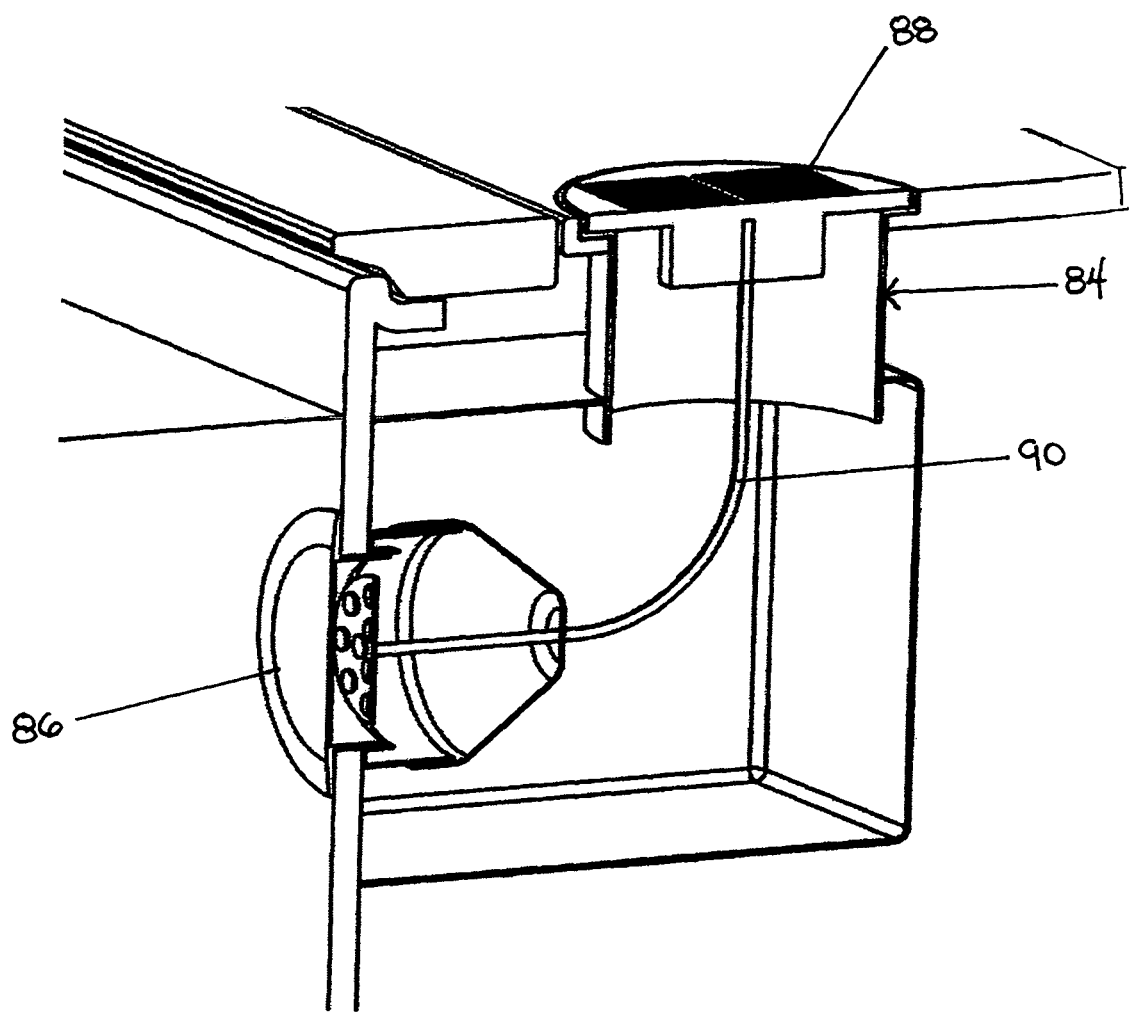
FIG. 8 is a sectional view illustrating a still further embodiment of the present invention.

Turning to FIG. 8, there is illustrated a light 86 mounted in a water return 84. The solar panel 88 is used to provide power to light 86 while electrical cord 90 interconnects the two.

Figure 9A:
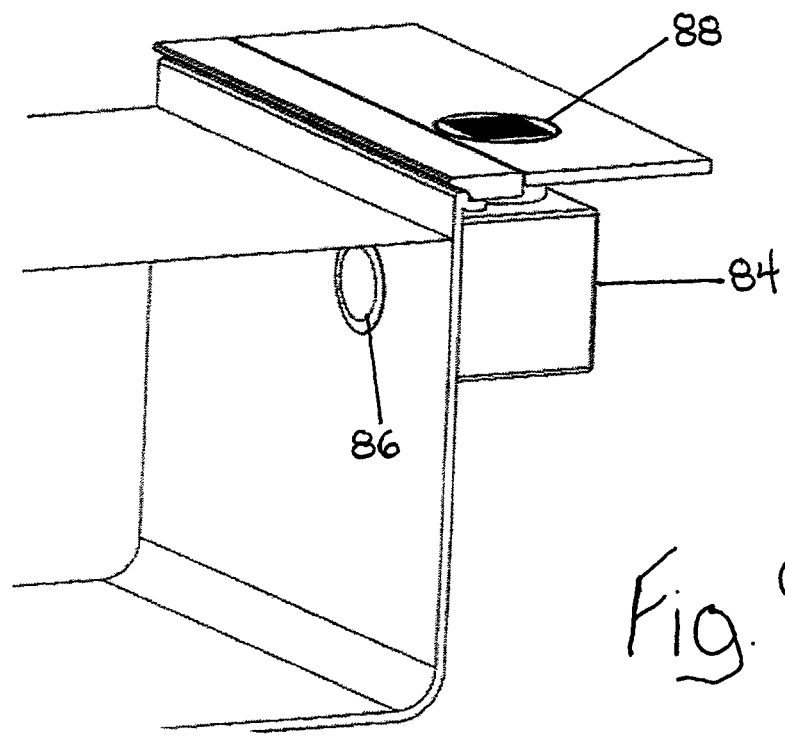
FIGS. 9A and 9B are perspective and sectional views of the embodiment of FIG. 8.
Figure 9B:
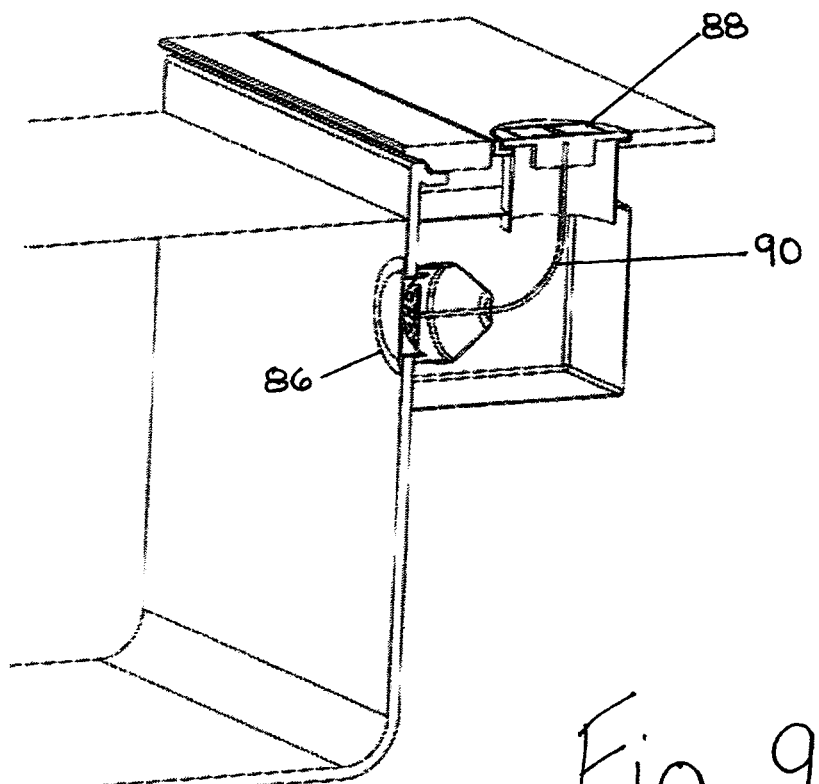

FIGS. 9A and 9B illustrate an arrangement similar to that of FIG. 8.

Figure 10:
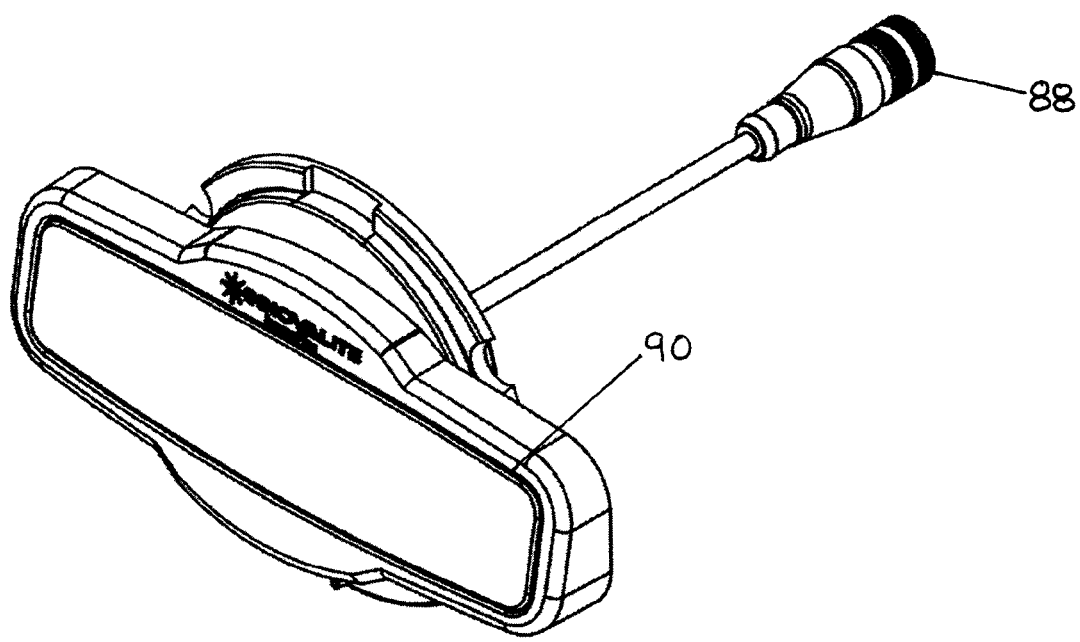
FIG. 10 is a perspective view of a further embodiment.
Figure 11:
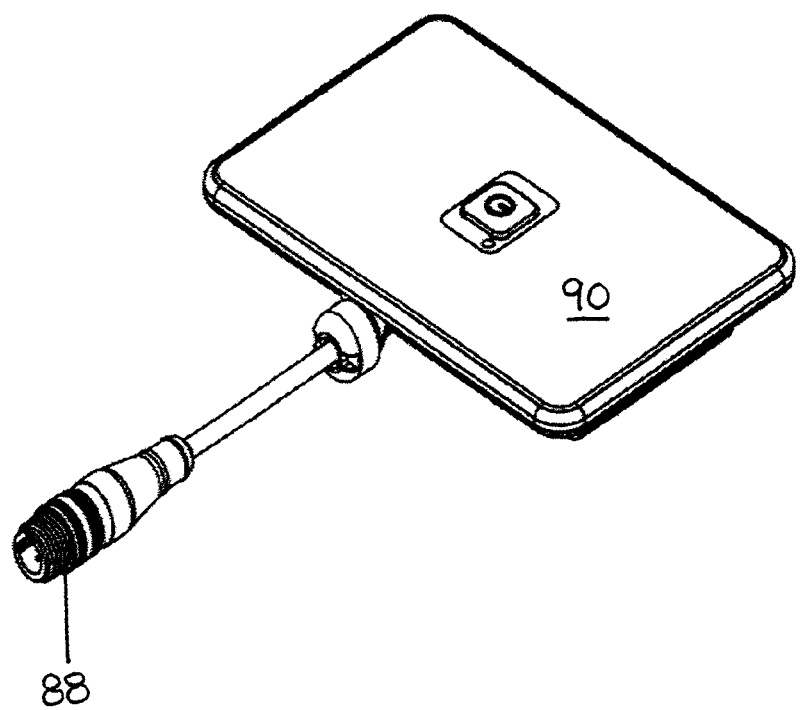
FIG. 11 is a perspective view of a still further embodiment of a solar lamp for pools.

In FIGS. 10 and 11, a light 88 is connected to a solar panel 90 as in previously described embodiments.

Figure 12:
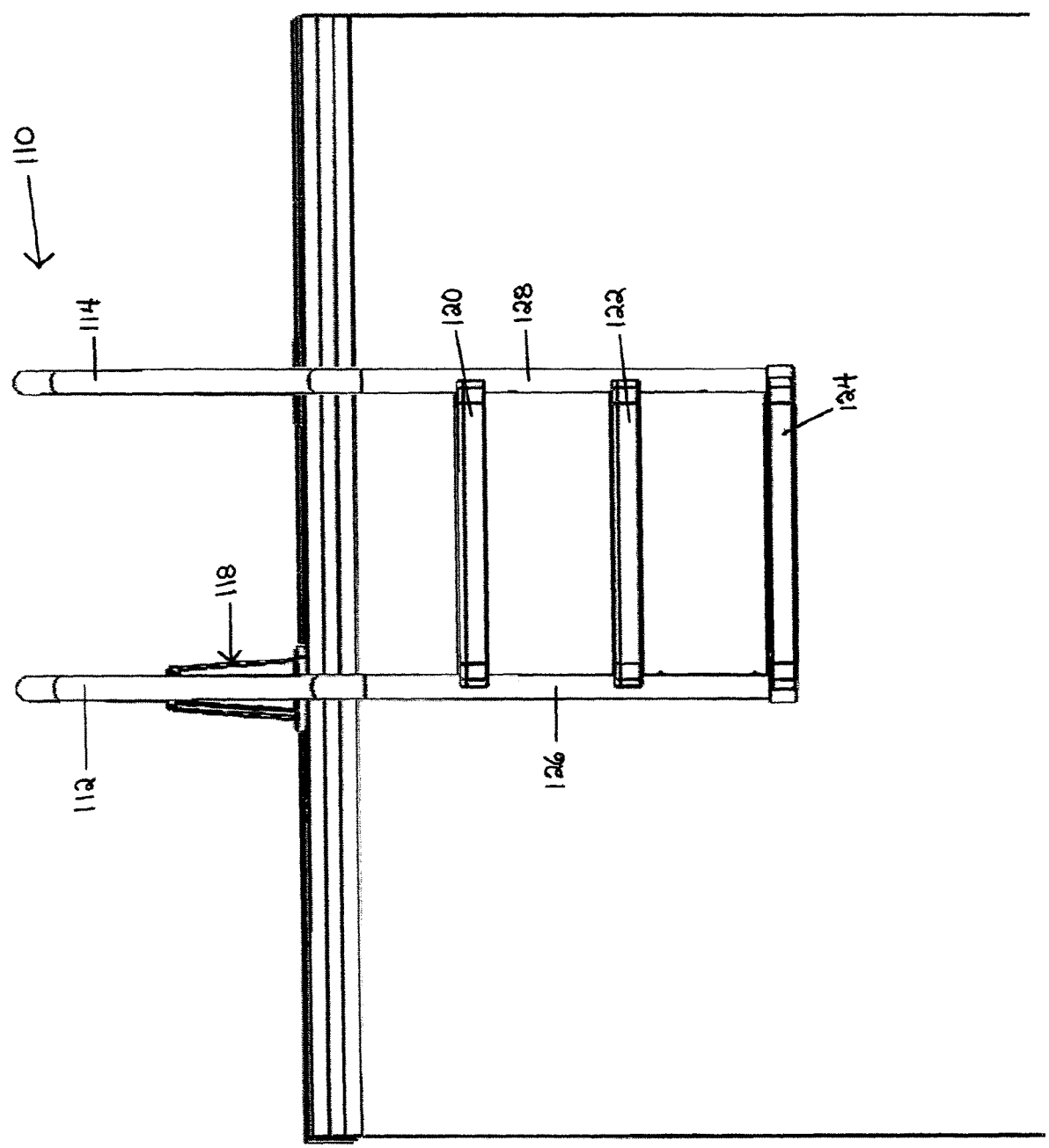
FIG. 12 is a side elevational of a ladder assembly used for a swimming pool.
Figure 13:
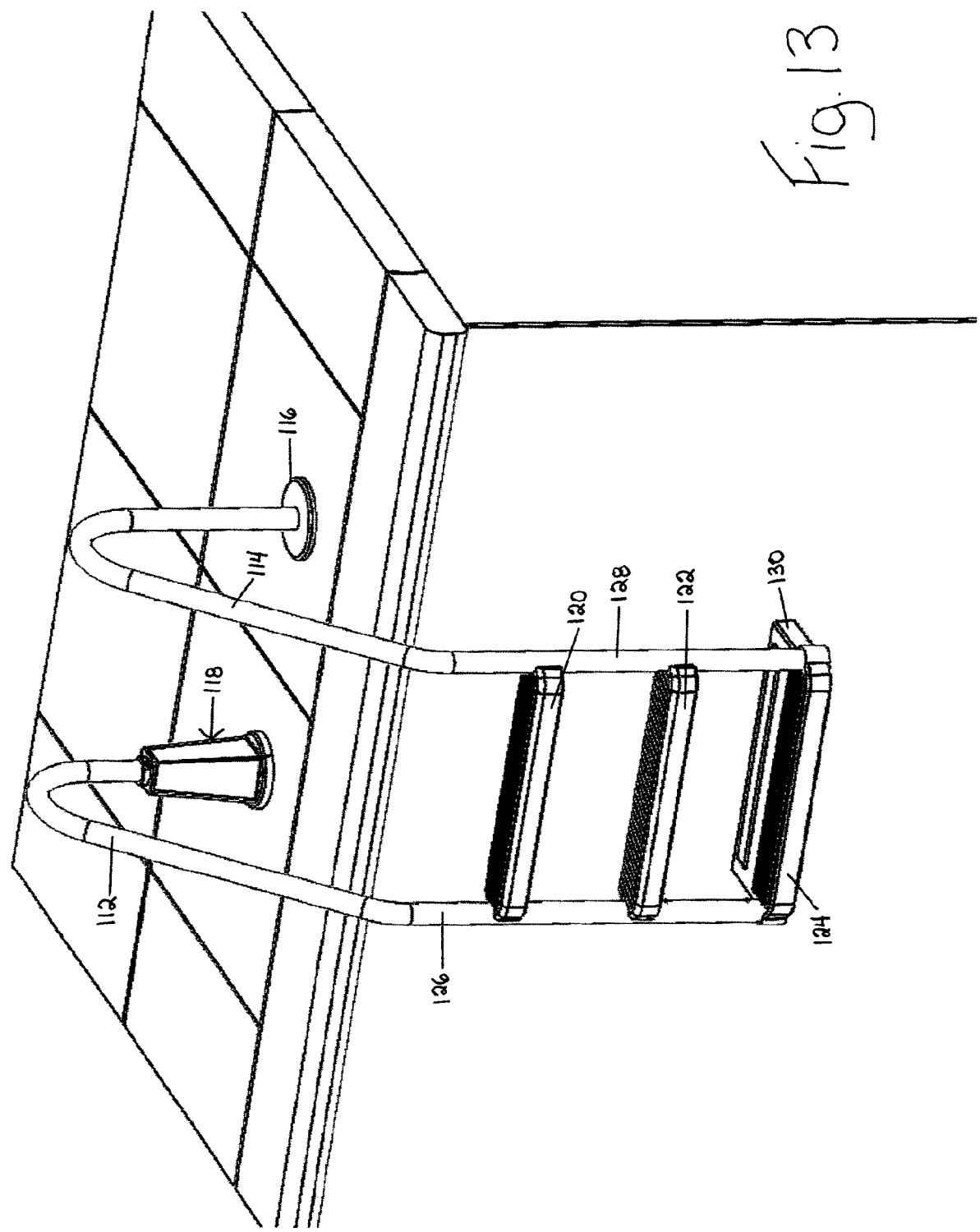
FIG. 13 is a perspective view thereof.

A further embodiment is illustrated in FIGS. 12 and 13 and reference will now be made thereto. As illustrated, there is provided a stair assembly generally designated by reference numeral 110. Stair assembly 110 is provided with handrails 112, 114 in a conventional manner. On one of the handrails, there is provided a conventional escutcheon 116. On handrail 112, there is provided a solar panel escutcheon generally designated by reference numeral 118. Escutcheon 118 is provided with vertically extending solar panels to provide electrical power.

Stair assembly 110 also includes a plurality of steps 120, 122 and 124. The steps extend between side rails 126, 128 in a conventional manner.

A light assembly 130 is provided and provides light extending both upwardly and downwardly. A light assembly 130 is provided between step 124 and the side of the pool.

Figure 14:
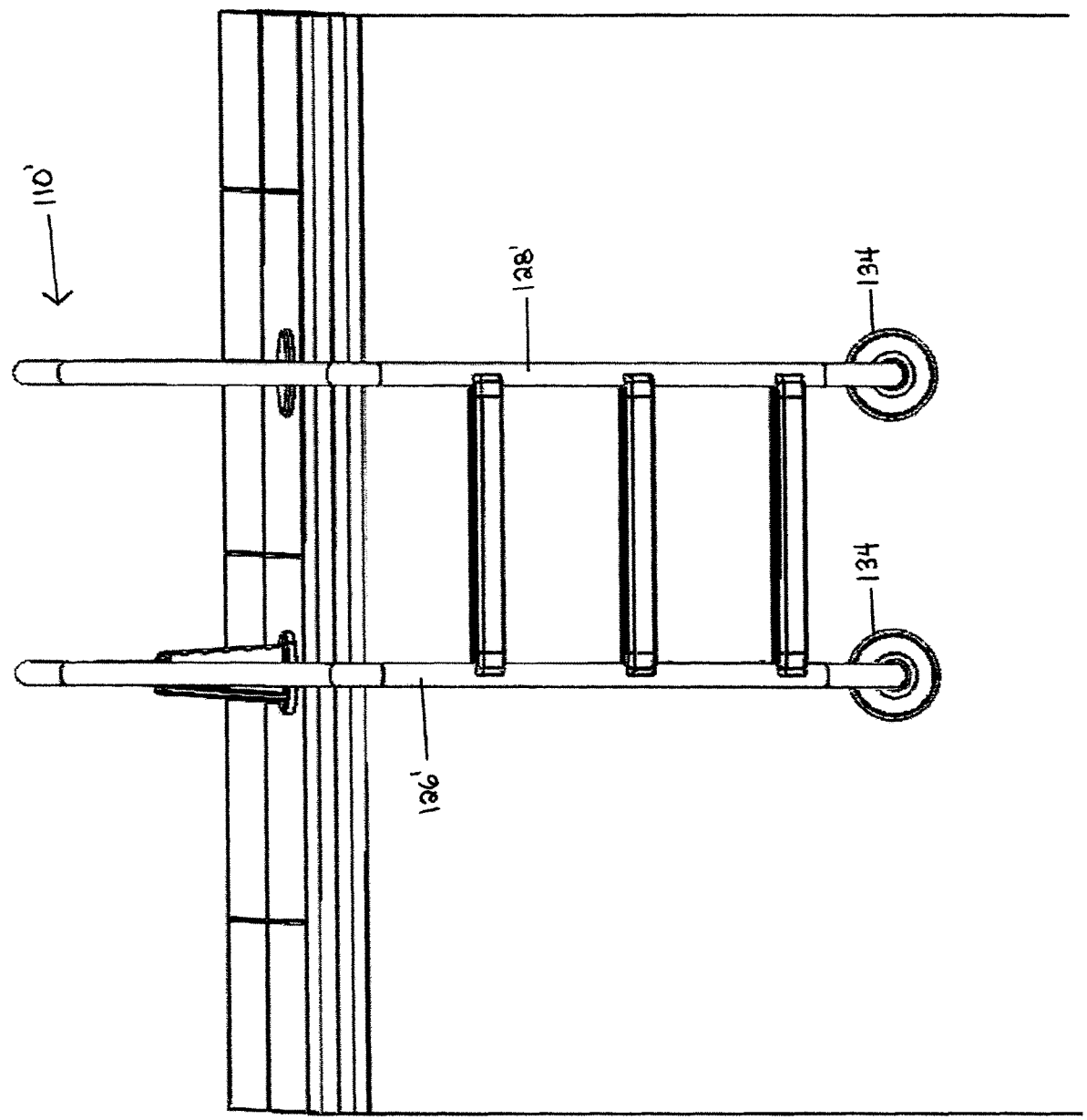
FIG. 14 is a front elevational of a further arrangement for a ladder having lights incorporated therein.
Figure 15:
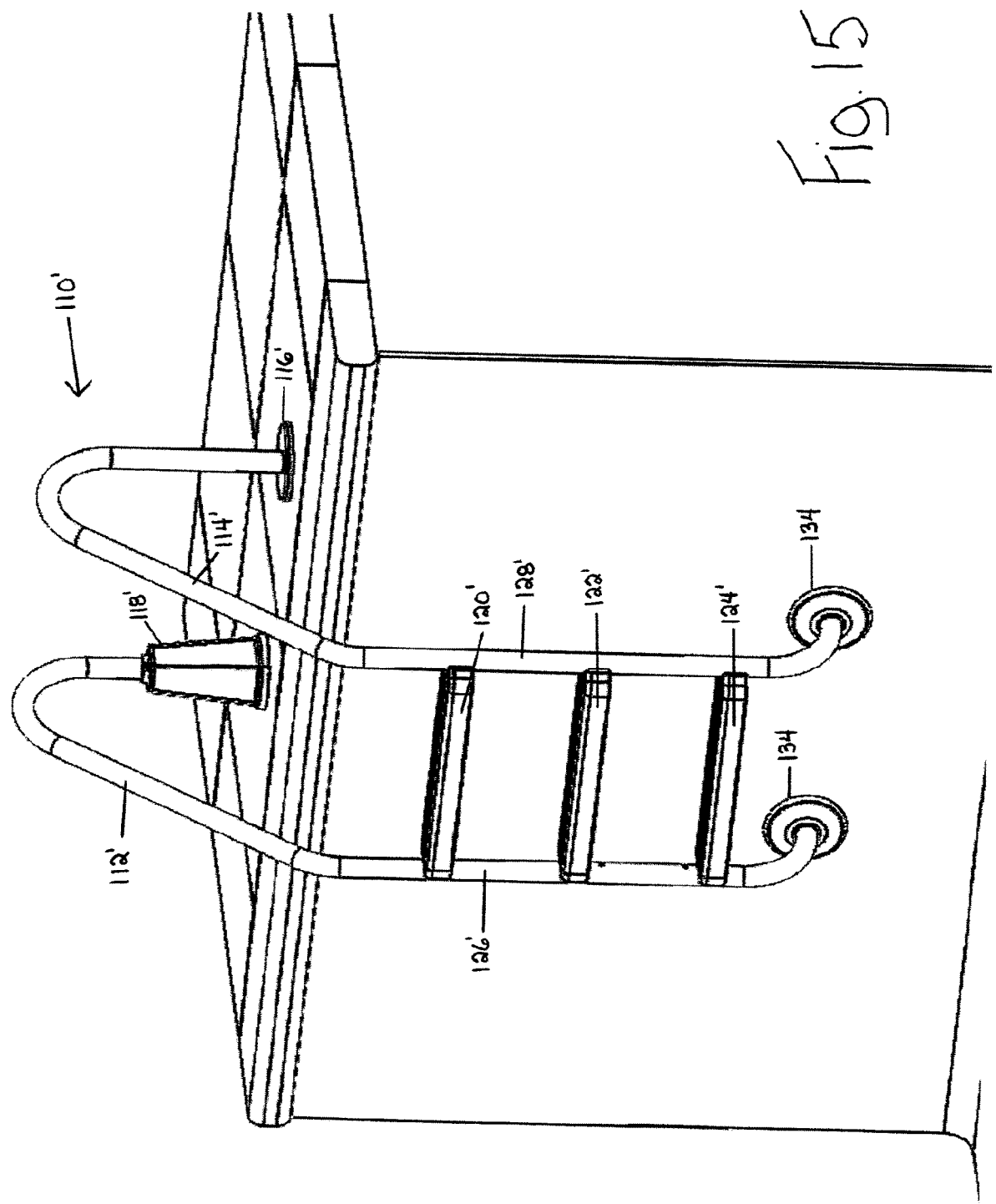
FIG. 15 is a perspective view of the ladder assembly of FIG. 14.

In the embodiments of FIGS. 14 and 15, a similar stair assembly is shown. Similar reference numerals are utilized for similar parts, but with a prime. Thus, there is provided a ladder assembly 110' with handrails 112',114'. The handrails have an escutcheon 116' and a solar panel escutcheon 118'. A plurality of steps 122' and 124' are mounted between guard rails 126', 128'. In this embodiment, a pair of LED lights 134 are provided, one at each of the feet of the ladder.

Figure 17:
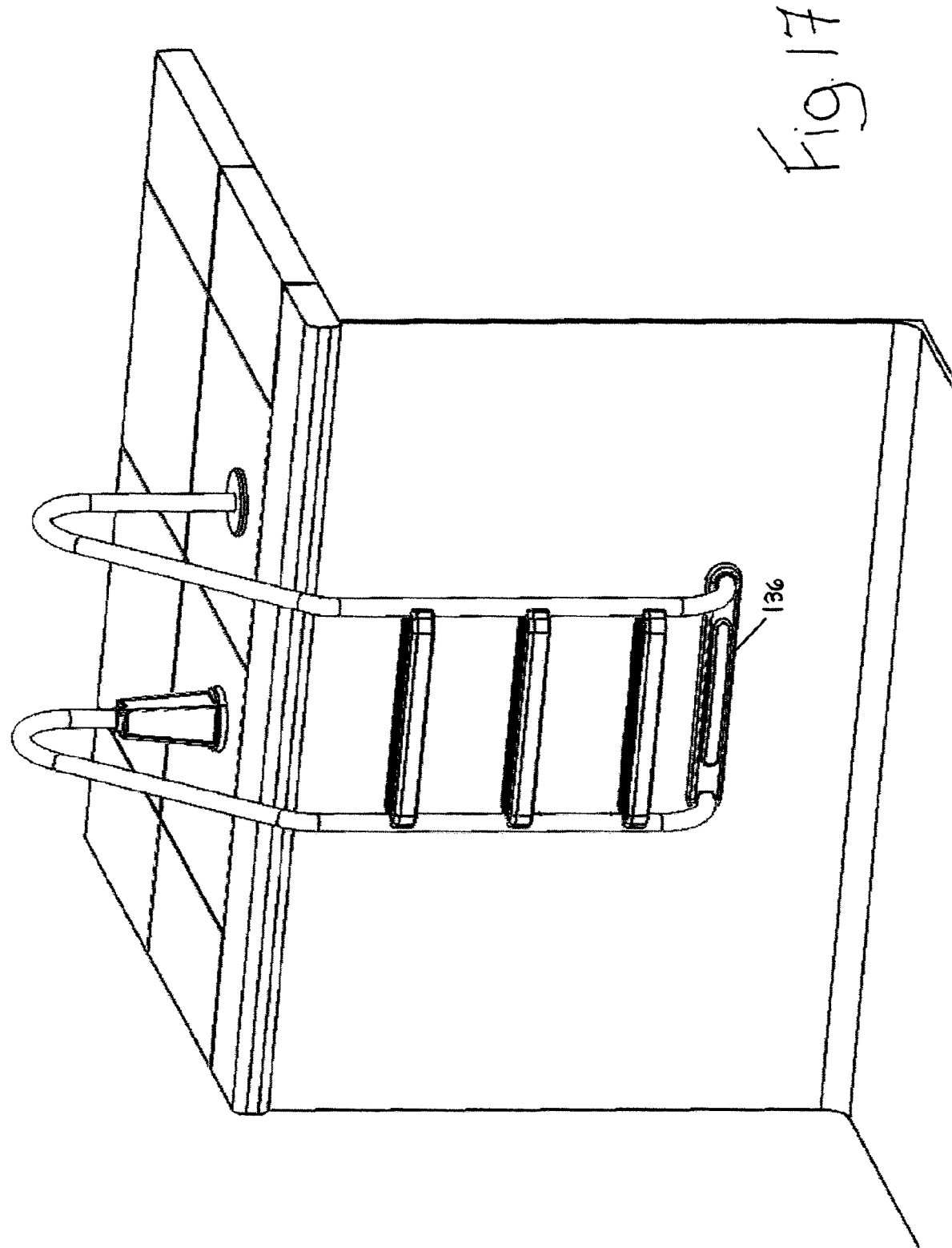
FIG. 17 is a perspective view of a ladder assembly.

In the embodiment of FIG. 17, a similar ladder assembly is shown except that a single LED light 136 is provided. LED light 136 stems from the top of the ladder.

Figure 18:
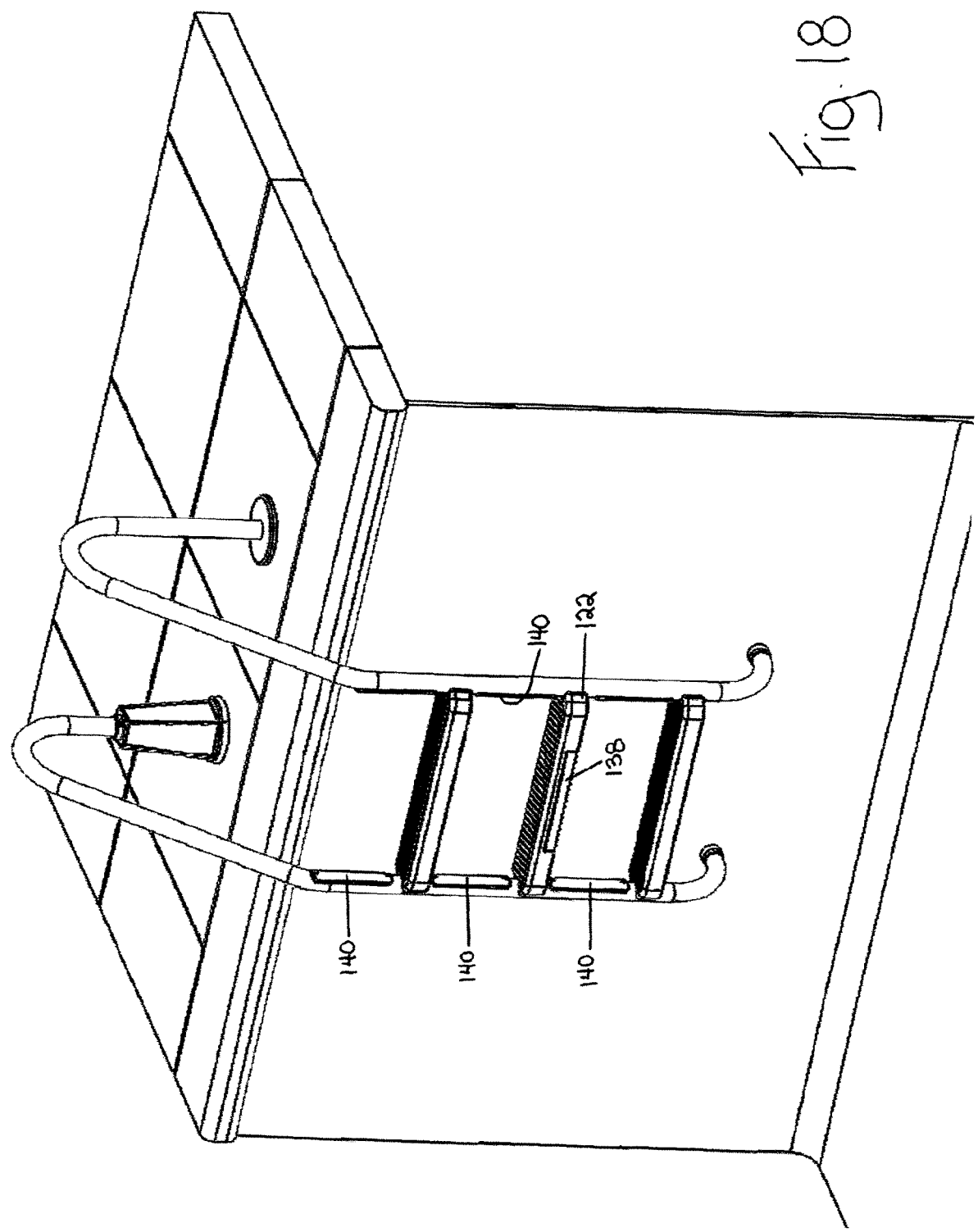
FIG. 18 is a perspective view of a further embodiment thereof.

In the embodiment of FIG. 18, a further arrangement is shown wherein there is provided a first LED light 138 mounted in step 122 while a plurality of lights 140 are mounted on the side rails 126, 128.

Figure 16:
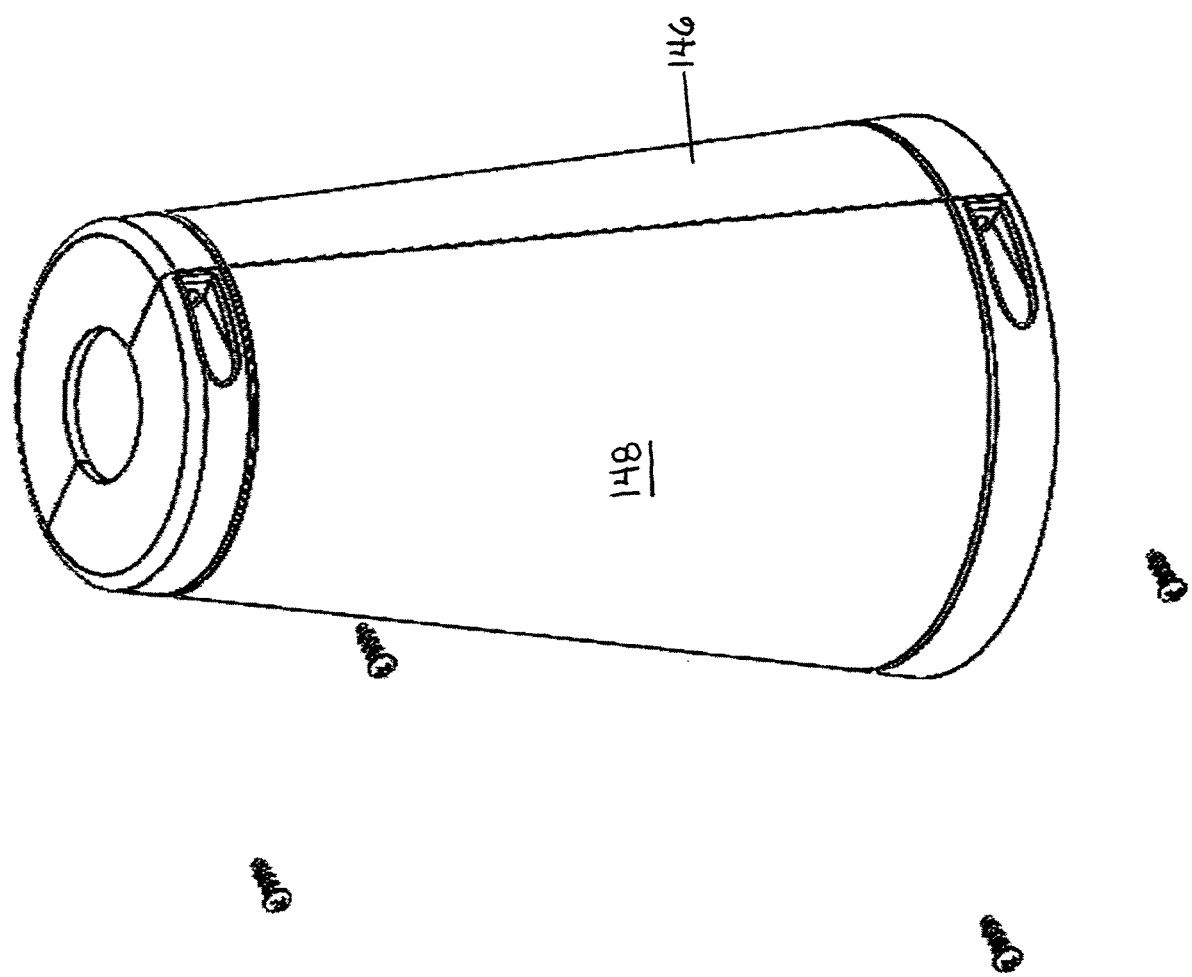
FIG. 16 is a perspective of a different arrangement of a escutcheon incorporating a solar panel.

As shown in FIG. 16, the solar panel is such that it may be formed in an arcuate manner rather than the rectangular structure shown in previous embodiments. As seen in this arrangement, the structure is formed of two halves 146, 148 suitably secured together. In the above described ladder assemblies, the wiring will run from the escutcheon 118 through the handrail and side rails 126 to the light assembly. Thus, all of the wiring is provided interiorly and no wiring is visible.

Figure 19:
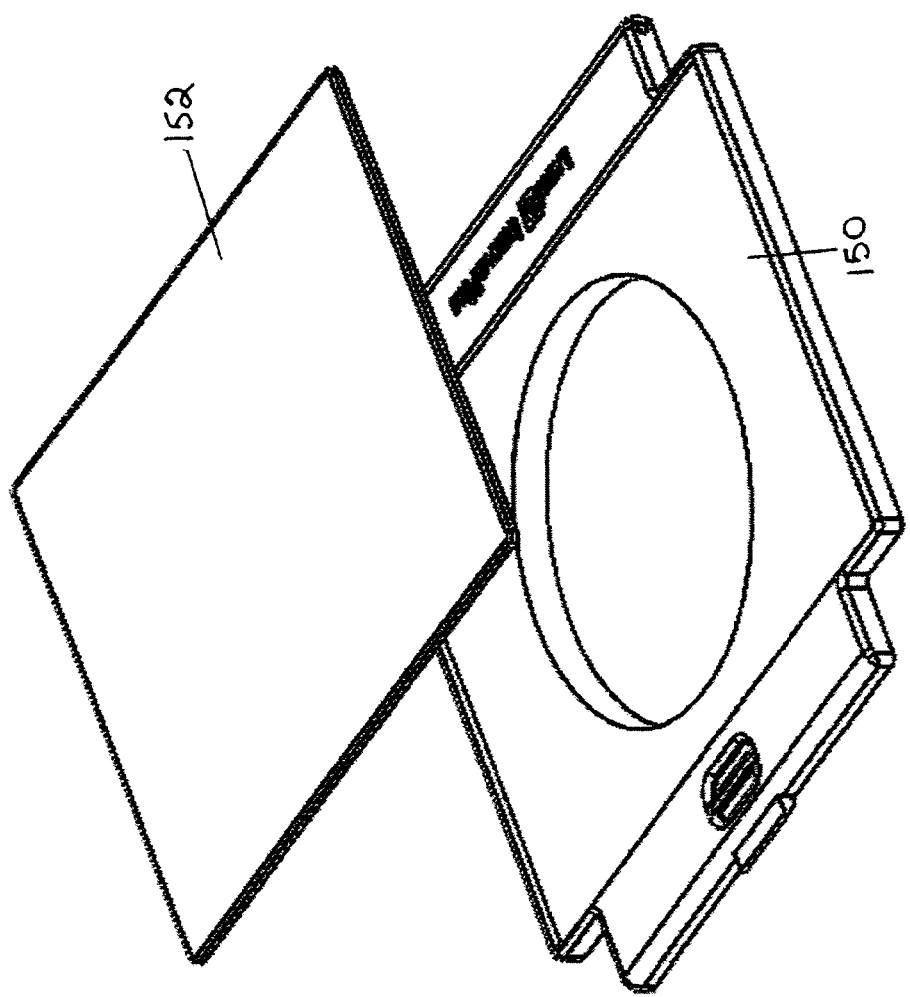
FIG. 19 is an exploded view of a portion of a skimmer cover.

As shown in FIG. 19, the present invention may utilize a solar panel 152 which is mounted on a skimmer frame 150. Thus, as seen in FIG. 20, the skimmer frame 150 is hingedly connected to cover a skimmer generally designated by reference numeral 156. In this embodiment, an electrical cord 154 will extend between solar panel 152 and a light mounted in the skimmer.

FIG. 21 illustrates an embodiment wherein a clip-on light 160 may be attached to the rail of a ladder assembly. In this embodiment, the solar panel will be attached to an upper portion of the stair assembly with the wiring running through the rails.

It will be understood that the above described embodiment is for purposes of illustration only and that changes and modifications may be made thereto without departing from the spirit and scope of the invention.

I claim:

1. A light assembly for a swimming pool having a stair assembly and a water return duct comprising:
   a solar panel (46) for generating electricity, said solar panel being located exteriorly of said swimming pool;
   a battery (52) electrically connected to said solar panel;
   a low voltage light (36) mounted in said swimming pool;
   electrical wires (68) extending between said battery (52) and said low voltage light (36) to supply power thereto, said batter and said low voltage light being mounted on one of said stair assembly and said water return duct, said solar panel being mounted on said stair assembly.

2. A light assembly for a swimming pool having a stair assembly having a water return duct comprising:
   a solar panel for generating electricity, said solar panel being mounted on a escutcheon (118) for said stair assembly;
   a battery (52) electrically connected to said solar panel;
   a low voltage light (130) mounted in said swimming pool; and
   and an electrical wire (68) extending between said battery (52) and said low voltage light 36 to supply power thereto, said battery and said low voltage light being mounted on one of said stair assembly and said water return duct.

3. The light assembly for a swimming pool have a stair assembly and a water return duct comprising:
   a solar panel (46) for generating electricity, said solar panel being located exteriorly of said swimming pool;
   a batter (52) electrically connected to said solar panel;
   a low voltage light (36) being formed on a foot of said stair assembly; and
   electrical wires (16) extending between said battery (52) and said low voltage light (36) to supply power thereto, said solar panel and said battery being mounted on one of said stair assembly and said water return duct.

4. A light assembly for a swimming pool having a water return comprising:
   a solar panel (46) for generating electricity, said solar panel being formed as a cover for a skimmer assembly of said water return duct;
   a battery (52) electrically connected to said solar panel;
   a low voltage light (36) mounted in said swimming pool; and
   electrical wires (68) extending between said battery (52) and said low voltage light (36) to supply power thereto;
   said battery and said low voltage light being mounted on one of said stair assembly and said water return duct.

* * * * *